United States Patent Office 3,153,667
Patented Oct. 20, 1964

3,153,667
PROCESS FOR PRODUCING DIARYLAMINO AROMATIC DICARBOXYLIC ACIDS
Howard L. Smith, Newark, Del., assignor to E. I. du Pont de Nemours and Company, Wilmington, Del., a corporation of Delaware
No Drawing. Filed Sept. 2, 1959, Ser. No. 840,489
6 Claims. (Cl. 260—518)

This invention relates to a new and improved process for the production of aromatic dicarboxylic acids.

Compounds which may be prepared according to this invention may be represented by the following empirical formula:

H—N—Ar'
|
HOOC—Ar—COOH
|
H—N—Ar' wherein Ar is an aromatic group such as might be derived from benzene, naphthalene, or anthraquinone, or substituted derivatives thereof, and the Ar' groups are identical aromatic groups such as might be derived from benzene, naphthalene, anthraquinone, fluorene, or fluorenone, or substituted derivatives thereof.

Typical of the above type of compounds are the 2,5-diarylaminoterephthalic acids which have the following formula:

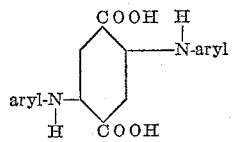

The preparation of such diarylamino terephthalic acids is disclosed in the prior art. For example, Liebermann, Ann. 404, 295–308 (1914), discloses a process for preparing 2,5-dianilinoterephthalic acid by first oxidizing diethyl 2,5-dianilino-3,6-dihydroterephthalate, and then hydrolyzing the oxidized ester to the desired acid.

It is an object of the present invention to provide a new and improved process for the production of aromatic dicarboxylic acids of the type described above. This process comprises reacting an N-aryl formamide with a dihalo aromatic dicarboxylic acid or the lower dialkyl esters thereof, having a halogen atom attached to the aromatic ring in ortho position to each carboxyl group or to each ester group in the case of the ester, in the presence of a copper Ullmann condensation catalyst and an acid acceptor selected from the group consisting of potassium carbonate and sodium carbonate. The end result of this reaction is that N-aryl groups from the N-aryl formamide are substituted for the two halogens on the dihalo aromatic dicarboxylic acid; thus, stoichiometric proportions are 2 mols of the N-aryl formamide for each mol of dihalo aromatic dicarboxylic acid.

The general procedure for the reaction is merely heating the reactants in the presence of the catalyst and the acid acceptor. Reaction temperatures range from 170–220° C., with a range of 190° C.–200° C. being preferred. Temperatures in excess of 220° C. may be used, but yields may be somewhat less. After the heating, the dicarboxylic acid derivative is subjected to hydrolysis to insure removal of any residual formyl groups or any ester groups (if an ester is the starting reactant) which might remain after the condensation. This hydrolysis can be accomplished by digesting the aromatic dicarboxylic acid derivative in an aqueous solution of the acid acceptor which, as mentioned above, may be either sodium carbonate or potassium carbonate. The presence of the carbonate solution at this stage of the process can be provided simply by the addition of water, if excess carbonate is used at the start of the reaction. It is expeditious to add more carbonate or other alkali at this point. During this treatment to insure hydrolysis of the ester and formyl groups, the aromatic dicarboxylic acid derivative is converted to its dialkali metal salt. Subsequent acidification precipitates the diarylamino aromatic dicarboxylic acid end product.

The N-aryl formamides suitable as reactants in this invention have the formula

where R is an aryl radical. When R is phenyl, the compound is formanilide, the latter being a preferred reactant. However, it is pointed out that the significant portion of the formamide molecule with respect to this reaction is the N-formyl group

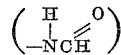

and the reaction is independent of the specific aryl group present as long as this group is inert under the conditions of the reactions. N-aryl formamides which may be used include those in which R is phenyl, naphthyl, fluorenyl, fluorenonyl, anthraquinonyl, and ring-substituted derivatives thereof where the substituents may be nitro groups, lower alkyl ester groups (—COOR'), halogens, such as fluorine and chlorine, lower alkyl groups such as methyl, ethyl, and propyl groups, and lower alkoxy groups such as methoxy, ethoxy, and propoxy groups. Typical of the compounds from which the N-aryl formamides can be derived are the following amines: orthofluoroaniline, parachloroaniline, metatoluidine, para anisidine, beta naphthylamine, orthonitroaniline, methyl anthranilate, 2-aminofluorenone, 2 - aminofluorene, 1 - aminoanthraquinone, parachloro-ortho-toluidine, ortho-chloro-para-toluidine, dichloroanilines, and the like.

The dihalo aromatic dicarboxylic acids contemplated for use in this invention are represented by the formula (COOH)$_2$—Ar—(Hal)$_2$ and the ester by the formula (COOR')$_2$—Ar—(Hal)$_2$, where Ar is an aromatic group and R' is a lower alkyl group such as methyl, ethyl, propyl, or butyl, and the halogens are attached to carbon atoms ortho to different carboxyl groups or ester groups on the rings, depending upon whether the compound is an acid or an ester. When the Ar group is derived from benzene, the acids are dihalo derivatives of the well known class of phthalic acids. Specific dihalo aromatic dicarboxylic acid derivatives which may be used include dichloroterephthalic acid, dichloroisophthalic acid, and dichlorophthalic acid, and the corresponding lower dialkyl esters. Also, the corresponding dibromo, difluoro, and diiodo compounds may be used. It is necessary only that the reacting halogen atoms be oriented in ortho positions to each of two carboxyl groups. Typical compounds which may be used in the reaction include dimethyl 2,5-dichloroterephthalate, dimethyl 4,6-dichloroisophthalate, dimethyl 3,6-dichlorophthalate, as well as derivatives of other aromatic dicarboxylic acids such as 3,7-dichloro-2,6-naphthalene dicarboxylic acid, 3,7-dibromo-2,6-anthraquinone dicarboxylic acid, and the like. In the dihalo aromatic dicarboxylic acid and esters used in this invention wherein the aromatic group has more than one ring, the two carboxyl groups with their adjacent halogen atoms may be on either the same or different rings. The preferred derivatives of the dihalo aromatic dicarboxylic acids are the dimethyl esters. However, the other lower alkyl esters such as the diethyl or dipropyl esters are equally applicable. The free acids themselves usually give poorer yields than the esters.

A variety of Ullmann condensation catalysts may be employed. By Ullmann condensation catalysts is meant copper in suitable form and compounds of copper that are normally considered by the art as Ullmann condensation catalysts. Representative as suitable catalysts are copper powder, copper-bronze powder, copper and iodine mixture, copper halides such as cuprous iodide, cuprous bromide, and cuprous chloride, cupric acetate monohydrate, cupric carbonate, or cuprous nitrate, when used in substantially anhydrous form. The amounts used are catalytic amounts for this type of condensation and may vary from 0.05 mol to about 0.25 mol per mol of the dicarboxylic acid or its ester. A preferred range is 0.1 to 0.2 mol per mol of the dicarboxylic acid or ester.

The acid acceptor, i.e., the potassium carbonate or sodium carbonate, is employed in quantities providing from 1 to 3 equivalents, preferably at least 2 equivalents (1 mol) for each equivalent of halogen acid to be produced in the metathetical reaction between the N-aryl formamide and the dihalo aromatic dicarboxylic acid or the corresponding dialkyl esters.

In one of the preferred embodiments of this invention, one mol of the dimethyl ester of 2,5-dichloroterephthalic acid is mixed with 2.2 mols (10% excess) of formanilide and 2.4 mols of potassium carbonate, together with 0.1 mol of cupric acetate monohydrate and heated slowly to about 200° C. Formanilide is a liquid at 47° C. so that the mixture can be well stirred during the early part of the reaction resulting in an intimate mixture of the ingredients in a substantially fluid or slightly pasty mass. The condensation results in the liberation of HCl which immediately reacts with the potassium carbonate present so that there is a copious evolution of carbon dioxide as the synthesis proceeds. After a suitable period of reaction at a temperature in the range of 200° C., the mixture is cooled, added to water, and the mixture then boiled for about one hour. It is then filtered from any insoluble catalyst or impurities, and the solution is acidified (pH between 5 and 6), the precipitate filtered, washed and dried to give 2,5-di-anilinoterephthalic acid in yields of 85% to 90%.

For a clearer understanding of the invention, the following specific examples are given. These examples are intended to be merely illustrative of the invention and not in limitation thereof. Unless otherwise specified, all parts are by weight.

*Example I*

263 parts (1 mol) of dimethyl 2,5-dichloroterephthalate is mixed with 266 parts (2.2 mols) of formanilide, 414 parts (3 mols or 6 equivalents) of potassium carbonate, and 20 parts (0.1 mol) of cupric acetate monohydrate. The mixture is heated with agitation over a period of about 1 hour to about 200° C. and held at 200° C. (±10°) for about 3 hours. After cooling below 100° C., it is diluted with about 2000 parts of a 5% aqueous solution of sodium hydroxide, boiled vigorously for about 1 hour, and filtered from insoluble impurities. The solution is then acidified carefully to a pH of 5.5 whereupon the desired 2,5-dianilinoterephthalic acid is precipitated in a relatively pure form as a dark bluish red precipitate readily soluble in aqueous alkali. It is isolated by filtration, washing free of soluble salts, and drying at an elevated temperature to give 313 parts of 2,5-dianilinoterephthalic acid (90% yield).

The dimethyl 2,5-dichloroterephthalate in this process may be replaced by 352 parts of dimethyl 2,5-dibromoterephthalate or 446 parts of dimethyl 2,5-diiodoterephthalate with substantially equivalent results.

*Example II*

The process of Example I is repeated except that 20 parts of cupric acetate monohydrate is replaced by 13 parts (0.2 mol) of copper powder. After the heating cycle and isolation procedure specified in Example I, 2,5-dianilinoterephthalic acid is isolated in good yield.

*Example III*

The dimethyl ester of 2,5-dichloroterephthalic acid of Example I is replaced with 291 parts (1 mol) of diethyl 2,5-dichloroterephthalate. In other respects, the process of Example I is used throughout to give a comparable yield and quality of product.

An equivalent amount of the dipropyl ester may be used with comparable results.

*Example IV*

263 parts of dimethyl 2,5-dichloroterephthalate, 334 parts (2.4 mols) of N-formyl-o-fluoroaniline, 330 parts (2.4 mols) of potassium carbonate, and 20 parts (0.1 mol) of cupric acetate monohydrate are mixed in a suitable vessel equipped for heating and agitation. While stirring, the mixture is heated slowly to about 170° C., whereupon a vigorous evolution of carbon dioxide begins and continues as the temperature is gradually raised to about 200–210° C. and held at this temperature for about 2 hours. The mixture is then cooled to below 100° C., about 2500 parts of water is added, and the mixture boiled vigorously for about 1 hour. After filtering from insoluble impurities, the solution is carefully acidified to a pH of about 6.0, whereupon the 2,5-bis(2'-fluoroanilino) terephthalic acid is precipitated in a relatively pure form. It is isolated by filtering, washing with cold water, and drying to give a good yield of product.

*Example V*

In this example, 373 parts (2.4 mols) of N-formyl-p-chloroaniline is used in place of the N-formyl-o-fluoroaniline of Example IV. The resulting product is 2,5-bis-(4'-chloroanilino) terephthalic acid.

*Example VI*

This follows the process of Example IV except that the substituted formanilide used is 324 parts of N-formyl-m-toluidine and the product comprises 2,5-di-m-toluidinoterephthalic acid, in good yield.

In like manner, N-formyl-p-anisidine and N-formyl-beta-naphthylamine may be used in about 10–20% excess to give the corresponding substituted dianilinoterephthalic acids.

*Example VII*

263 parts (1 mol) of dimethyl 4,6-dichloroisophthalate, 290 parts (2.4 mols) of formanilide, 330 parts (2.4 mols) of potassium carbonate, and 20 parts of cupric acetate monohydrate are reacted in a manner analogous to that shown in Example IV, and the product isolated as there shown, to give 4,6-dianilinoisophthalic acid.

*Example VIII*

The condensation of 290 parts formanilide with 263 parts of dimethyl 3,6-dichlorophthalate under the conditions shown in Example IV results in 3,6-dianilinophthalic acid of good purity.

The examples show the preferred conditions with respect to a number of variables which are discussed in more detail below.

The time of heating is critical only in that it be continued until the reaction is complete, for which a partial indication is the cessation of the evolution of carbon dioxide. In general, at least about 1.5 hours above 170° C. are required and more complete reaction is usually obtained by heating from 2 to 3 hours in the temperature range of 190° C.–200° C. When heating is extended beyond about 3.5 to 4 hours, particularly at the higher temperatures, the yield seems to suffer.

The N-aryl formamide should be present in excess of the stoichiometric amount. The preferred amount is from 10–20% excess but the process is operable within a range of about 5% to about 100% excess. A larger excess makes the reaction mixture more fluid and hence enables better agitation but, above about 20% excess, does not seem to promote better yields. By the same token, an inert solvent such as trichlorobenzene, nitrobenzene, kerosene, and the like, may be used to promote fluidity, the only requirements being inertness and a boiling point above about 200° C.

With regard to the acid acceptor, potassium carbonate has been found to exhibit the highest efficiency in promoting the condensation. However, sodium carbonate also promotes the condensation though it is with lower yield or less pure products.

Filtration after the boiling step is conventional procedure for removing the catalyst and any insoluble impurities, and then acidification precipitates the free acid. It has been found that traces of impurities can be removed by careful adjustment of the acidity to bring about a selective precipitation of the desired products in high purity. Adjustment of the pH to the range of 5.5 to 6.0 accomplishes this purpose, after which conventional filtration and drying may be carried out.

The process of this invention offers a new and economical method for the production of such compounds as 2,5-dianilinoterephthalic acid, an intermediate in the production of quinacridones. Also, the process offers the advantage of eliminating water-immiscible solvents or diluents, making it easy to isolate and purify the desired end products.

Since it is obvious that many changes and modifications can be made in the above-described details without departing from the nature and spirit of the invention, it is to be understood that the invention is not to be limited to said details except as set forth in the appended claims.

I claim:

1. A process for producing a diarylamino aromatic dicarboxylic acid comprising condensing at elevated temperatures 1 mol of a di-lower alkyl ester of an acid selected from the group consisting of 2,5-dichloroterephthalic acid, 4,6-dichloroisophthalic acid, and 3,6-dichlorophthalic acid, with 2 mols of an N-aryl formamide, in the presence of a copper Ullmann condensation catalyst and potassium carbonate, hydrolyzing the diarylamino aromatic dicarboxylic acid derivative formed in the condensation reaction, and then acidifying said derivative to produce a diarylamino aromatic dicarboxylic acid.

2. A process for producing a diarylamino aromatic dicarboxylic acid comprising condensing at elevated temperatures 1 mol of dimethyl 2,5-dichloroterephthalate with 2 mols of an N-aryl formamide, in the presence of a copper Ullmann condensation catalyst and potassium carbonate, hydrolyzing the diarylamino armoatic dicarboxylic acid derivative formed in the condensation reaction and then acidifying said derivative to produce a diarylamino aromatic dicarboxylic acid.

3. A process for producing a diarylamino aromatic dicarboxylic acid comprising condensing at elevated temperatures 1 mol of dimethyl 2,5-dichloroterephthalate with 2 mols of formanilide, in the presence of a copper Ullmann condensation catalyst and potassium carbonate, hydrolyzing the diarylamino aromatic dicarboxylic acid derivative formed in the condensation reaction, and then acidifying said derivative to produce a diarylamino aromatic dicarboxylic acid.

4. A process for producing 2,5-dianilinoterephthalic acid comprising condensing at elevated temperatures 1 mol of dimethyl 2,5-dichloroterephthalate with 2 mols of formanilide in the presence of cupric acetate monohydrate and potassium carbonate, hydrolyzing the dianilino terephthalic acid derivative formed in the condensation reaction, and then acidifying said derivative to produce 2,5-dianilinoterephthalic acid.

5. A process for producing a diaryl amino aromatic dicarboxylic acid comprising condensing at elevated temperatures 1 mol of dimethyl 4,6-dichloroisophthalate with 2 mols of an N-aryl formamide, in the presence of a copper Ullmann condensation catalyst and potassium carbonate, hydrolyzing the diarylamino aromatic dicarboxylic acid derivative formed in the condensation reaction, and then acidifying said derivative to produce a diarylamino aromatic dicarboxylic acid.

6. A process for producing a diarylamino aromatic dicarboxylic acid comprising condensing at elevated temperatures 1 mol of dimethyl 3,6-dichlorophthalate with 2 mols of an N-aryl formamide, in the presence of a copper Ullmann condensation catalyst and potassium carbonate, hydrolyzing the diarylamino aromatic dicarboxylic acid derivative formed in the condensation reaction, and then acidifying said derivative to produce a diarylamino aromatic dicarboxylic acid.

References Cited in the file of this patent

UNITED STATES PATENTS

| 2,830,990 | Struve | Apr. 15, 1958 |
| 2,924,620 | Miller | Feb. 9, 1960 |

FOREIGN PATENTS

| 148,179 | Germany | Jan. 14, 1904 |
| 172,073 | Switzerland | Dec. 17, 1934 |

OTHER REFERENCES

Beilstein: Handbuch der Organische Chemie, vol. 12, page 234 (1929).

Wagner et al.: Synthetic Organic Chemistry, page 667 (1953).